A. Ivers,
Water-Closet Cistern.

N°. 59,029. Patented Oct. 23, 1866.

Witnesses.
Chas. H. Smith
Geo. D. Walker

Inventor:
Alfred Ivers

UNITED STATES PATENT OFFICE.

ALFRED IVERS, OF NEW YORK, N. Y.

CISTERN FOR WATER-CLOSETS, URINALS, &c.

Specification forming part of Letters Patent No. 59,029, dated October 23, 1866.

*To all whom it may concern:*

Be it known that I, ALFRED IVERS, of the city and State of New York, have invented, made, and applied to use a certain new and useful Improvement in Cisterns for Water-Closets, Sinks, Urinals, &c.; and I do hereby declare the following to be a full, clear, and exact description of the said invention, reference being had to the annexed drawings, making part of this specification, wherein—

Figure 1:
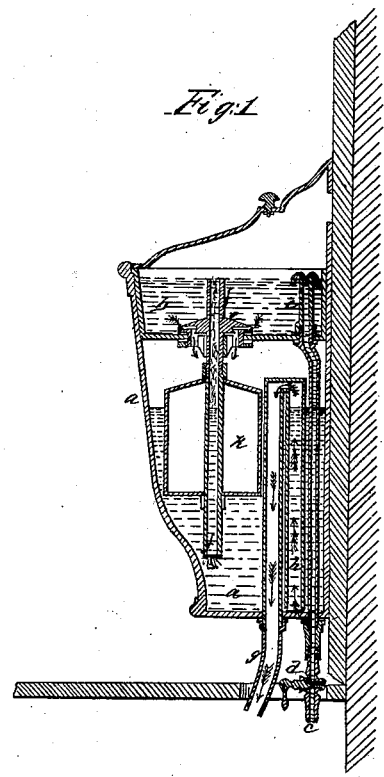
Figure 2:
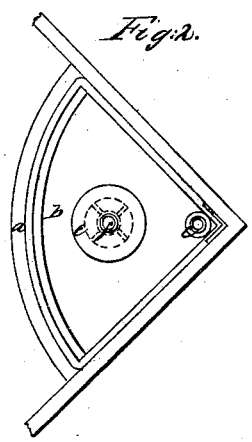

Figure 1 is a vertical section of said cistern complete for use; and Fig. 2 is a plan of the same with the cover removed.

Similar marks of reference denote the same parts.

The object of my invention is to provide a periodical wash for a water-closet, sink, or urinal, or a series of them, said wash being sudden and copious, although derived from a continuous small stream of water.

By supplying water to closets, &c., in this manner I am enabled to overcome many and serious difficulties heretofore experienced, some of which may be enumerated as follows: First, water-closets are often used and left without the water being supplied for their cleansing; second, a vast quantity of water is wasted by leakage of self-acting valves employed in water-closets, and the supply thus running either does not pass through the basin, or, if it does, the stream is so small as not to effect any washing and cleansing; third, where several closets are connected together a separate cock or apparatus for supplying each has to be provided, whereas my cistern only requires pipes connecting it with the different closets, and all are periodically and simultaneously washed; fourth, the present cisterns and pipes for water-closets are liable to freeze, while in mine the water, running constantly in a small stream from the supply, is not liable to be frozen; fifth, a periodical and copious wash renders the closet permanently operative, and prevents the soil-pipe being obstructed from an accumulation through lack of sufficient water.

The nature of my said invention consists in a double receptacle combined with a siphon, the water running in a small stream continuously into the upper receptacle, and from that overflowing into the lower or main receptacle until the water rises nearly to the apex or bend of the siphon, when the contents of the upper receptacle are suddenly discharged into the lower receptacle by the action of a float and fill the siphon, so as to cause it to be operative and draw the contents out of the main receptacle, producing a sudden and copious wash to the closet, urinal, sink, or similar article.

In the drawings, $a$ represents the cistern, within which is the upper or secondary cistern or receptacle, $b$. $c$ is the supply-pipe from a suitable source; and $d$ is the cock, formed with a small hole through the plug, or regulated so that a continuous stream of about one-sixteenth of an inch diameter is allowed to run for one closet, or in that proportion.

The water runs into the receptacle $b$ from the upper end of the supply-pipe $c$, and is retained therein by a valve, $e$, with a hollow stem, $f$; and $k$ is a float within the cistern $a$, and attached to or acting upon the stem $f$. $g$ is the pipe leading to the water-closet or other article to be washed out. $h$ is the siphon-leg, united at the upper end to the upper part of the pipe $g$ by a bend or by a flattened case. This latter is preferred, as the water in the cistern has only to be raised sufficiently to immerse this flattened case to cause the pipes $g$ $h$ to fill and act as a siphon and draw off the contents of the cistern $a$, and give a copious wash to the closet or other article.

It will be understood that after the cistern or receptacle $b$ has filled by the gradual flow of the water, (the valve $e$ being closed,) the water passes into the upper end of the tube $f$ and fills up the cistern $a$ until the water raises the float $k$ and valve $e$, allowing the water from the receptacle $b$ to run suddenly into the cistern $a$ and fill the siphon-pipe and cause it to operate as before mentioned.

The receptacle $b$ might be fitted upon horizontal hinges, these hinges being made hollow for the supply-water to run into said vessel through them, and the receptacle be so placed that the action of the float $k$ would tip this vessel over suddenly and cause the siphon to become operative by the sudden accumulation of water, as before, the weight of the float drawing the vessel *b* back to its place when the cistern is emptied.

What I claim, and desire to secure by Letters Patent, is—

1. The receptacles or cisterns *a* and *c* and siphon-pipe *g h*, in combination with a float to cause the delivery of water from the vessel *c*, for the purposes and substantially as specified.

2. A cistern for water-closets, urinals, and sinks, to which water is gradually and continuously supplied, in combination with a float and siphon, or equivalent mechanism, to effect a periodical discharge by the action of the water of the contents of said cistern, substantially as set forth.

In witness whereof I have hereunto set my signature this 14th day of February, A. D. 1866.

ALFRED IVERS.

Witnesses:
GEO. D. WALKER,
CHAS. H. SMITH.